United States Patent

[11] 3,615,541

[72] Inventor Nerwin Hubert
 Rochester, N.Y.
[21] Appl. No. 675,608
[22] Filed Oct. 16, 1967
[45] Patented Oct. 26, 1971
[73] Assignee Eastman Kodak Company
 Rochester, N.Y.

[54] SLIDE TRANSPARENCY UNIT FOR IN CAMERA PROCESSING
 16 Claims, 13 Drawing Figs.
[52] U.S. Cl. .................................................. 96/76 C, 95/19
[51] Int. Cl. .................................................. G03c 1/48, G03c 3/00
[50] Field of Search .......................................... 96/29, 76, 77; 95/19

[56] References Cited
UNITED STATES PATENTS
2,846,309 8/1958 Land ............................ 96/76
3,309,201 3/1967 Friedman et al. .............. 96/29
3,396,147 8/1968 Downey ....................... 95/19

Primary Examiner—Norman G. Torchin
Assistant Examiner—Alfonso T. Suro Pico
Attorneys—Robert W. Hampton and Gary D. Fields ABSTRACT: A slide transparency unit is provided with a pair of rupturable pods attached to a rectangular mount having a central opening, across which a photosensitive transparency extends. The first pod is adapted to be ruptured so that a developing agent contained therein is injected into a space between the transparency and a strippable sheet so that development of the transparency image can take place. After a suitable development period, the second pod is ruptured and the developing agent therein also is injected into the space between the transparency and the strippable sheet and spread across the transparency so that the image is fixed on the transparency. Finally, the strippable sheet, the pods, and any unabsorbed developing agents are stripped from the unit so that the unit is ready for viewing.

HUBERT NERWIN
INVENTOR.
BY Gary D. Fields
Robert W. Hampton
ATTORNEYS

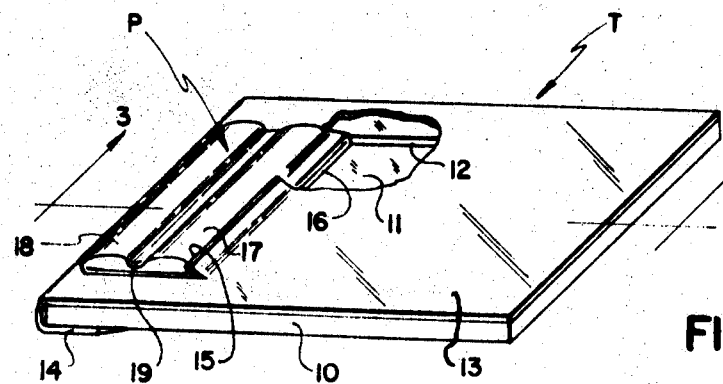
FIG.2
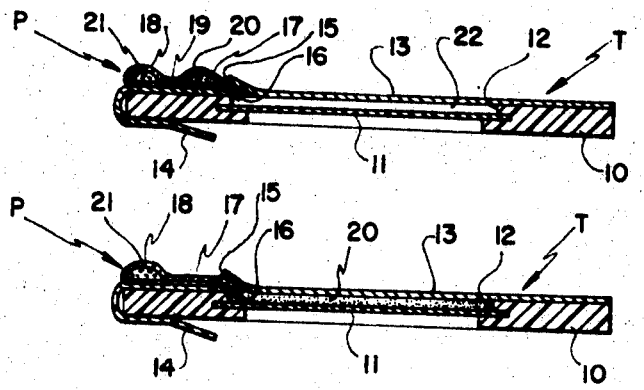
FIG.3
FIG.4
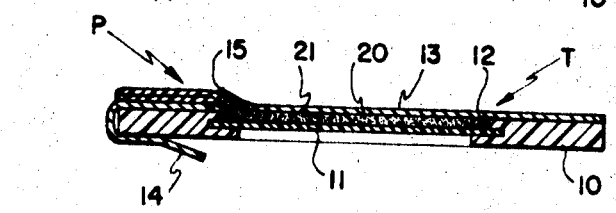
FIG.5
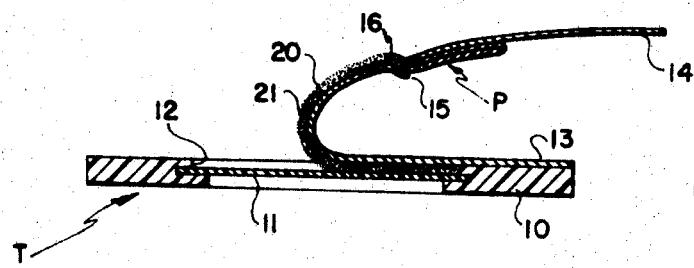
FIG.6
HUBERT NERWIN
*INVENTOR.*
BY Gary D. Fields
Robert W. Hampton
ATTORNEYS

SLIDE TRANSPARENCY UNIT FOR IN CAMERA PROCESSING

CROSS-REFERENCE TO RELATED APPLICATION

The transparency unit of this invention could be utilized in the camera disclosed in may copending application Ser. No. 675,597, filed Oct. 16, 1967.

BACKGROUND OF THE INVENTION

1. Field of the Invention

This invention relates to a slide transparency unit which is viewed by projecting a light through the transparency and projecting the image thereof on a suitable surface for viewing, and more particularly to such a unit which may be developed within a camera.

2. Description of the Prior Art

A single-pod system is disclosed in Friedman et al. U.S. Pat. No. 3,309,201, which is directed to a transparency unit for effecting a diffusion transfer, utilizing a separate image-receiving surface and a photosensitive surface. In addition, the structure there disclosed includes a leader which is adapted to extend through a development chamber in the camera and through an exit slot so that the leader may be pulled to effect processing of the transparency unit after exposure.

SUMMARY OF THE INVENTION

The transparency units of this invention each utilize a two-pod system wherein the pods are attached to a strippable sheet which is removably attached to a mount having a transparency across a central opening. The units are particularly adapted for use with a camera having an integral transparency-unit-advancing means for rupturing the pods and spreading the developing agents. In addition, the transparency unit of this invention will find particular application for a silver-dyed-bleach process, but could also be utilized in a diffusion-transfer process. In two embodiments, a flap is provided on the strippable sheet which can be grasped between the fingers to strip the ruptured pods, the sheet, and any excess developing agents away from the transparency unit after development. In another embodiment, a separable breakoff member is provided on the mount of the transparency unit which can be broken away after the transparency unit has been developed, and the strippable sheet and pods, which are fixedly attached to the member can be separated from the unit with the member. In still another embodiment, one pod is adjacent to the mount while the other pod is adjacent to the breakoff member. The strippable sheet on which the pods are supported is fixedly attached to the breakoff member, which may be broken away after development and the ruptured pods and strippable sheet then removed therewith.

BRIEF DESCRIPTION OF THE DRAWINGS

FIG. 2 is a perspective view of the transparency unit of FIG. 1 showing the unit in assembled condition with parts broken away for clarity of illustration;

FIG. 3 is a longitudinal section, taken along line 3—3 of FIG. 2, showing the transparency unit in assembled condition;

FIG. 4 is a horizontal section, similar to FIG. 3, showing one of the pods ruptured and the developing agent which had been contained therein spread across the transparency;

FIG. 5 is a horizontal section, similar to FIGS. 3 and 4, showing both pods ruptured and the developing agents therein spread across the transparency;

FIG. 6 is a horizontal section, similar to FIGS. 3–5, showing the strippable sheet being pulled from the transparency unit with the emulsion material adhering thereto;

DESCRIPTION OF THE PREFERRED EMBODIMENTS

Figure 1:
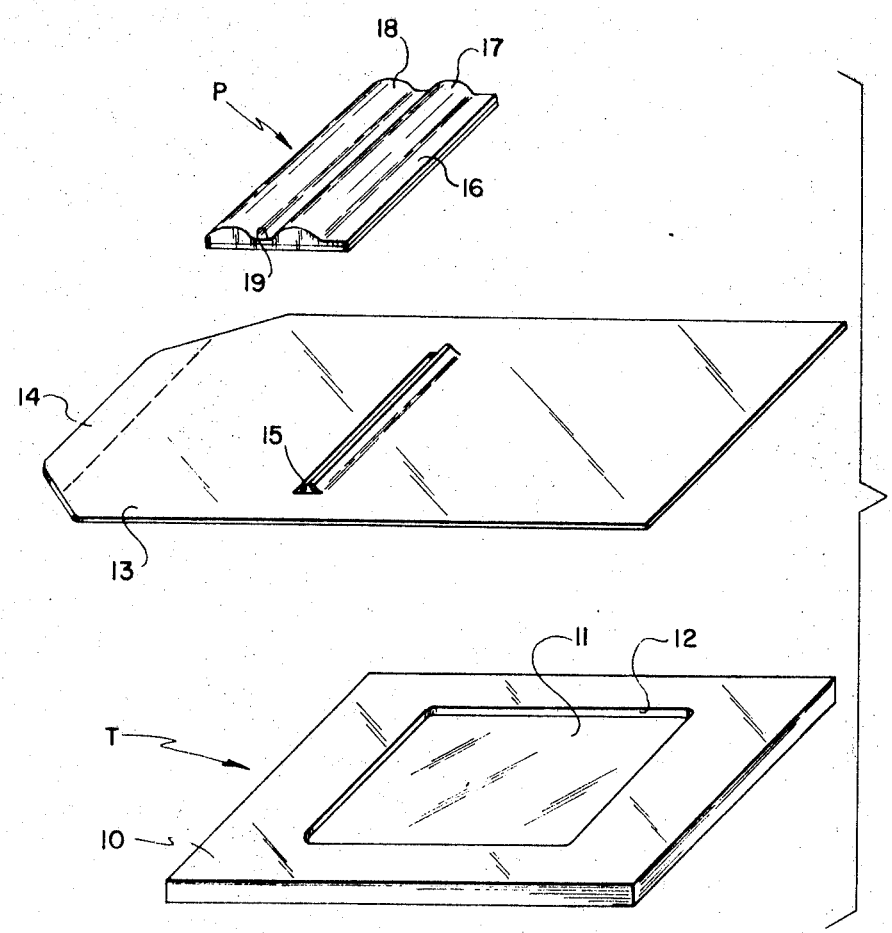
FIG. 1 is an exploded view of one embodiment of this invention showing the pod construction, the strippable sheet and a transparency unit.

In accordance with this invention, a transparency unit T, shown in FIGS. 1–6, includes a mount 10 having a transparency 11 in a central opening 12, and is adapted to be exposed and processed within a camera. The transparency unit T has a strippable sheet 13 removably attached, as by an adhesive, to one surface of mount 10, as shown in FIG. 2, prior to processing. The sheet is provided with a flap 14 which extends over one end of the mount, as shown in FIGS. 2–5. Conveniently, the end of flap 14 is not adhesively attached to the transparency unit so that it can be easily grasped by the fingers for stripping the sheet from the transparency unit after development, as described below. Strippable sheet 13 is also provided with a central slot 15 for receiving a heat-sealed, rupturable lip 16 of a double-pod unit P having spaced pods 17 and 18 separated by a heat seal 19. The pods each contain a developing agent which may be viscous. For example, pod 17 may contain a developing fluid 20 and pod 18 may contain a fixing fluid 21. As best seen in FIGS. 2 and 3, the lip 16 communicates with space 22 between transparency 11 and sheet 13 so that the developing agents within the pods may be transferred to this space for developing an image on the transparency. Lip 16 may include a heat seal which is rupturable upon the application of a predetermined amount of pressure on pod 17 so that the developing agent therein may be squeezed into space 22 and spread thereacross by means provided within a camera.

During use, the transparency 11 will be exposed through a transparent base, not shown on the side of transparency 11 opposite strippable sheet 13. After exposure, a suitable means within the camera will cause a heat seal between pod 17 and lip 16 to be ruptured and the developing agent 20 in pod 17 to be exuded through lip 16 into space 22 and then spread across the transparency, as shown in FIG. 4. After the expiration of a suitable development period, suitable means within the camera will cause the heat seal 19 between pods 17 and 18 to be ruptured and the agent 21 in pod 18 to be squeezed through collapsed pod 17 and lip 16 into space 22, as shown in FIG. 5. During or after this operation, the transparency unit will be removed from the camera so that flap 14 can be grasped between the fingers and sheet 13 stripped from the unit, as shown in FIG. 6, removing the pods and any residue of the developing agents with sheet 13. The removed material may then be thrown away, after which the transparency unit T will be ready for immediate viewing.

Figure 7:
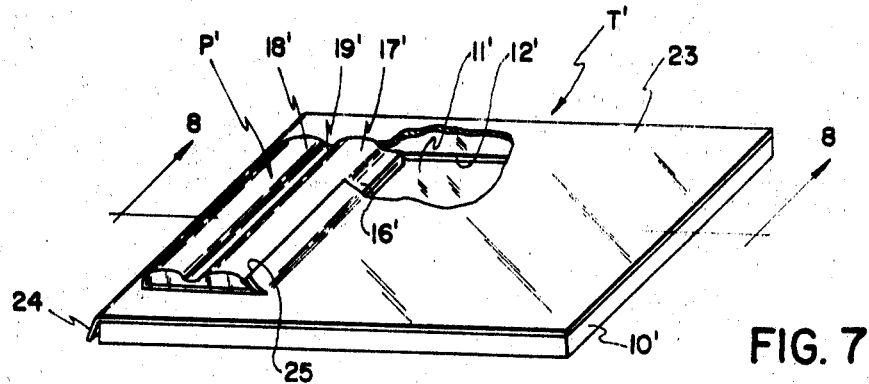
FIG. 7 is a perspective view of a transparency unit, similar to FIG. 2, showing an alternative embodiment wherein the flap on the strippable sheet has a different configuration.
Figure 8:
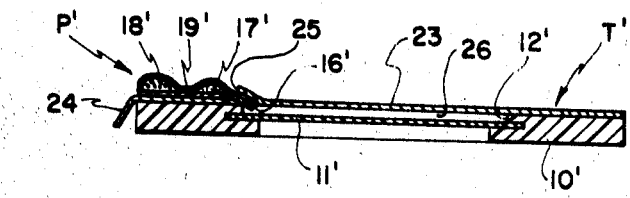
FIG. 8 is a horizontal section, taken along line 8—8 of FIG. 7, showing further details of the transparency unit of FIG. 7.

An alternative embodiment of the invention is shown in FIGS. 7 and 8, wherein a transparency unit T', having a mount 10' with a transparency 11' mounted in a central opening 12', is provided with a strippable sheet 23 which differs from sheet 13 in that sheet 23 has a relatively short flap 24 which merely extends over the edge of mount 10' and is not adhesively attached thereto. Sheet 23 is also has a pod unit P', which includes pods 17' and 18', separated by heat seal 19' and a heat-sealed, rupturable lip 16' extending through a slot 25 in sheet 23 for directing the developing agents into a space 26 between transparency 11' and sheet 23. The unit is exposed and developed in the same manner as described above with respect to the embodiment of FIGS. 1–6.

Figure 9:
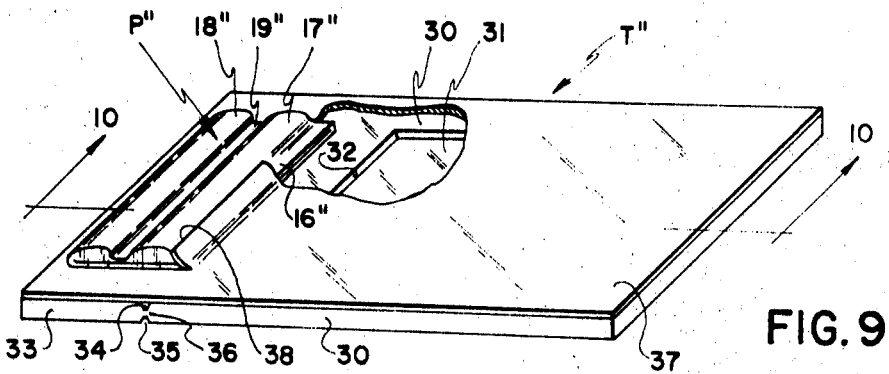
FIG. 9 is a perspective view, similar to FIGS. 2 and 7, showing a further alternative slide transparency unit having a breakaway tab on the mount to provide additional room for the pods and to facilitate separation of the strippable sheet from the mount.
Figure 10:
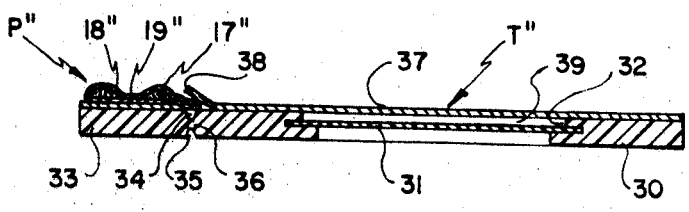
FIG. 10 is a horizontal section, taken along line 10—10 of FIG. 9, showing further details of the transparency unit of FIG. 9.

With a two-pod development system, the margin of the mount may be of insufficient width to support adequately both pods, particularly if a relatively large quantity of developing agents is required. If the mount were made larger, however the transparency unit would not fit in a conventional slide projector. That problem can be overcome by the further alternative shown in FIGS. 9 and 10. In this embodiment, a transparency unit T'' includes a mount 30 having a transparency 31 mounted in a central opening 32. A breakoff tab or breakaway portion 33 is provided at one end of mount 30, being formed integrally therewith but having a weakened area therebetween as a result of transverse scores 34 and 35 across both sides of the mount which provide a reduced neck 36. A strippable layer or sheet 37 overlies one side of the mount and is fixedly attached to tab 33 and removably attached to mount 30. Sheet 37 has a central slot 38 through which a lip 16'' of pod unit P'' extends. Conveniently, pod unit P'' may include spaced pods 17'' and 18'', separated by a rupturable heat seal 19'', positioned on strippable sheet 37 above tab 33. After the heat seals in the pod unit have been ruptured and the agents in the pods directed between the mount and sheet 37 to be spread in space 39 between transparency 31 and sheet 37, and after the unit has been removed from the camera, tab 33 can be broken away from mount 30, and strippable sheet 37 be together with tab 33, pod unit P'', and any unabsorbed developing agents, can then be stripped from mount 30 and thrown away.

Figure 11:
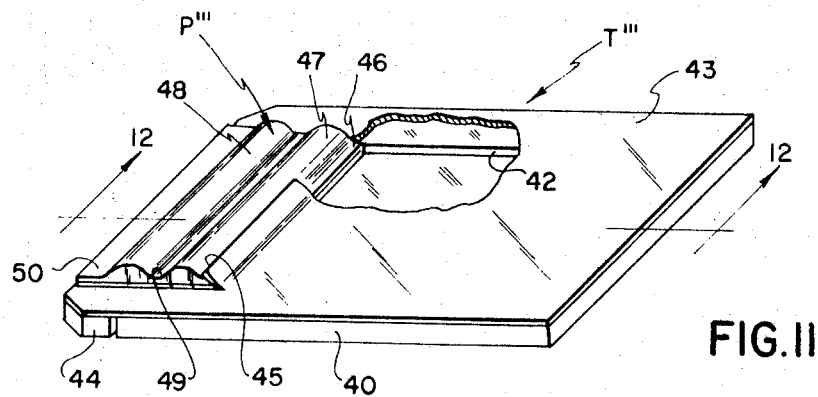
FIG. 11 is a perspective view, similar to FIGS. 2, 7, and 9, showing a still further alternative transparency unit having a smaller breakaway tab.
Figure 12:
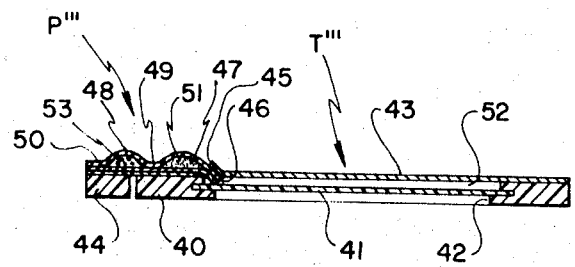
FIG. 12 is a horizontal section, taken along line 12—12 of FIG. 11, showing further details of the transparency unit of FIG. 11.
Figure 13:
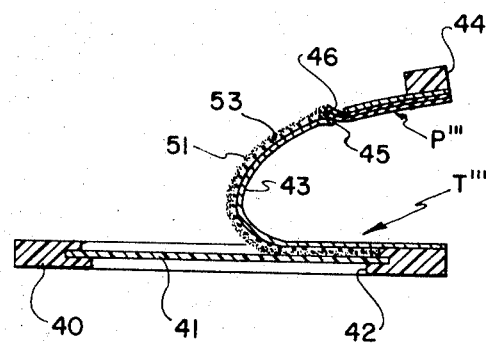
FIG. 13 is a horizontal section, similar to FIG. 12, showing the breakaway tab and strippable sheet, together with the emulsion, being peeled from the transparency unit.

A still further embodiment is shown in FIGS. 11–13 wherein a transparency unit T''' includes a mount 40 which supports a transparency 41 in a central opening 42. A strippable sheet 43 extends over one side of the mount and extends beyond one end thereof. A separate tab 44, which may be made of the same material as the mount, is fixedly attached to the extending end of sheet 43. Sheet 43 is provided with a central slot 45 through which extends also a heat-sealed, rupturable lip 46 of pod unit P''', which includes a pair of spaced pods 47 and 48 formed with a heat seal 49 therebetween and a heat seal 50 closing the outer end of the pod unit. It will be noted that, in this embodiment, a shorter tab is used and the pod unit is arranged so that pod 47 is positioned over the mount and pod 48 is positioned over tab 44, instead of positioning both pods over the tab as in the embodiment of FIGS. 9 and 10. The advantage of this arrangement is that a two-pod system can be used with a transparency unit having a lesser overall length than in the previous embodiment. This means that a smaller camera can be used to accommodate the transparency unit. As in the previous embodiments, the heat seal in lip 46 is rupturable so that developing agent 51 and pod 47 can be squeezed into the space 52 to develop the transparency image. Heat seal 49 also is rupturable so that agent 53 in pod 48 can pass through pod 47 and lip 46 to be similarly spread over the transparency. After the unit is removed from the camera, tab 44 can be grasped between the fingers and sheet 43 thereby peeled away from mount 40 to leave a finished transparency unit ready for viewing.

From the foregoing, it can be seen that the novel features of this invention are significant. A transparency unit has been provided which requires no leader but which includes a strippable sheet carrying a pod unit from which developing agents can be injected into a space between the sheet and the transparency for developing and fixing an image on the transparency. Subsequent to development of the image, and after removal of the unit from the camera, a flap or tab on the unit can be grasped to strip the sheet from the unit so that the unit will then be ready for viewing. In one embodiment the tab extends around one end of the transparency unit to the opposite side thereof, whereas in another embodiment the flap merely extends over the end of the unit. In a further embodiment, a breakaway tab which is fixedly attached to the strippable sheet is provided to support the pod unit, so that, following development and fixing of the image, the tab can be broken away from, and the strippable sheet then separated from, the transparency unit, after which the tab, sheet, and pod unit can be discarded. A still further embodiment discloses a tab which is separate from the transparency unit which is fixedly attached to the strippable sheet and supports one of the pods, the other pod being supported by the transparency unit mount. This tab also serves as a handle for grasping the strippable sheet and separating it and the pod unit from the transparency unit.

It will be understood that the term "transparency," as used herein, refers to the film exposure area either in its exposed unexposed, or developed condition.

The invention has been described in detail with particular reference to preferred embodiments thereof, but it will be understood that variations and modifications can be effected within the spirit and scope of the invention as described hereinabove and as defined in the appended claims.

I claim:
1. A self-processing film unit comprising:
   a photosensitive element for recording a latent image processable by spreading processing agent across said element;
   first and second separately rupturable pods each containing processing agent releasable onto said element for spreading across said element; and
   means coupling said pods and said photosensitive element for directing the contents of said first pod onto said element and thereafter for directing the contents of said second pod into said first pod and then onto said element.

2. A slide transparency unit adapted to be exposed and processed by a camera, the unit comprising:
   a transparency viewable after processing by transmitting light through said transparency;
   first and second rupturable pods attached to said unit adjacent to said transparency, each pod containing a processing agent extrudable onto said transparency after exposure thereof, the first pod including a rupturable lip and means extending toward said transparency for directing processing agent onto said transparency; and
   rupturable means separating said first and second pods, the processing agent in said second pod being transferable into said first pod and onto said transparency upon rupture of said rupturable means.

3. A slide transparency unit adapted to be exposed and processed within a camera, the unit comprising:
   a generally flat mount having a rectangular opening therein;
   a transparency extending across said opening and attached to said mount, said transparency being adapted to be viewed after processing by transmitting light through said opening and said transparency;
   a strippable sheet attached to a surface of said mount and extending over said opening for defining a space between said transparency and said sheet, said sheet having first and second sides, and means defining an aperture extending entirely through said sheet from the first side to the second side;
   a rupturable pod unit attached to said strippable sheet on the opposite side of said sheet from said transparency, said pod unit being adjacent to said opening for releasing a processing agent through said aperture into said space after exposure of said transparency; and
   grasping means coupled to said strippable sheet, contiguous to said mount, for separating said strippable sheet from said mount after processing.

4. A transparency unit as set forth in claim 3 further including:
   an elongated slot in said sheet adjacent to one edge of said opening; and
   a rupturable lip on said pod unit extending through said slot to said opening for directing said processing agent in said pod unit through said sheet and into said space.

5. A transparency unit as set forth in claim 3 wherein said pod unit includes:
first and second pods, said first pod being adapted to contain a processing agent and said second pod being adapted to contain a fixing agent.

6. A transparency unit as set forth in claim 3 wherein said pod unit further includes:
means coupled to said first pod and extending through said sheet for directing an agent in said first pod into said space; and
rupturable means separating said first and second pods, an agent in said second pod being transferable through said first pod and into said space upon rupture of said rupturable means.

7. A transparency unit as set forth in claim 3 wherein said grasping means includes:
a flap extending around one end of said mount to the other side of said mount.

8. A transparency unit as set forth in claim 3 wherein said grasping means includes:
a flap extending over one edge of said mount but terminating short of the other side of said mount.

9. A transparency unit as set forth in claim 3, wherein said grasping means includes:
a tab which is fixedly attached to said strippable sheet and is thicker than said sheet.

10. A transparency unit as set forth in claim 9 wherein said strippable sheet extends between said pod unit and said tab.

11. A transparency unit as set forth in claim 9 wherein said tab is integrally formed with one edge of said mount and is adapted to be broken away from said edge.

12. A transparency unit as set forth in claim 11 wherein said rupturable pod unit includes:
two pods attached to said strippable sheet, said sheet extending between said pods and said tab and having means defining a slot located adjacent to said edge of said mount.

13. A transparency unit as set forth in claim 9 wherein said tab is separable from said mount.

14. A transparency unit as set forth in claim 13 wherein said rupturable pod unit includes:
two pods attached to said strippable sheet, said sheet extending between one of said pods and said mount and between the other of said pods and said tab.

15. A transparency unit as set forth in claim 13 wherein said sheet has a slot therein spaced from said tab.

16. A self-processing photographic film unit comprising:
a photosensitive element for recording a latent image processable by spreading a processing agent across said element;
a cover sheet extending across said photosensitive element for assisting in the spreading of a processing agent across said element, said cover sheet having a first side facing said element and a second side facing away from said element;
a pod for releasably containing a processing agent, said pod being coupled to the second side of said cover sheet; and
means including a slot in said cover sheet for directing processing agent released from said container to the first side of said cover sheet and onto said photosensitive element for spreading across said element.

Disclaimer 3,615,541.—*Hubert Nerwin*, Rochester, N.Y. SLIDE TRANSPARENCY UNIT FOR IN CAMERA PROCESSING. Patent dated Oct. 26, 1971. Disclaimer filed Feb. 14, 1972, by the assignee, *Eastman Kodak Company*.

Hereby enters this disclaimer to claims 1 and 2 of said patent.

[*Official Gazette July 25, 1972.*]